United States Patent [19]

Leistner et al.

[11] Patent Number: 5,091,494

[45] Date of Patent: Feb. 25, 1992

[54] COPOLYESTER AMIDES, AND METHOD FOR MAKING

[75] Inventors: Dirk Leistner; Frank Böhme; Doris Pospiech; Manfred Rätzsch, all of Dresden; Christian Vieth, Karl-Marx-Stad; Michael Stephan, Dresden, all of German Democratic Rep.

[73] Assignee: Akademie der Wissenschaften der DDR, Berlin, German Democratic Rep.

[21] Appl. No.: 559,855

[22] Filed: Jul. 30, 1990

[51] Int. Cl.$^5$ ............................................. C08G 18/80
[52] U.S. Cl. ......................................... 528/45; 528/48; 528/74; 528/80; 528/83
[58] Field of Search ...................... 528/45, 48, 74, 80, 528/83

[56] References Cited

U.S. PATENT DOCUMENTS 3,836,491  9/1974  Taft et al. ........................... 528/80

Primary Examiner—Maurice J. Welsh
Attorney, Agent, or Firm—Schweitzer Cornman & Gross

[57] ABSTRACT

The invention relates to new aromatic/aliphatic and/or alicyclic copolyester amides with high molecular weights, without crosslinking. A subsequent solid phase condensation is avoided or is greatly limited in time. The occurrence of thermal decomposition reactions, dark discolorations of the polymers as well as the formation of block structures are avoided.

28 Claims, No Drawings

COPOLYESTER AMIDES, AND METHOD FOR MAKING

FIELD OF THE INVENTION

The present invention relates to copolyester amides from aromatic and aliphatic and/or alicyclic units and methods for their synthesis.

BACKGROUND OF THE INVENTION

In addition to pure polyamides and polyesters from aliphatic or aliphatic/aromatic components for the production of fibers and molded articles, also polyester amides have been described. In addition to copolymers of polyethylene terephthalate and polyamide 6 (J. Polym. Sci. Part B: Polym. Phys. 26 (1988) 7, 1469-81). Polyesters from aromatic diacids, hydroxycarboxylic acids, diols, aminocarboxylic acids, aminophenols and diamines have been disclosed for this purpose (U.S. Pat. Nos. 3,272,774; 4,272,625; 4,351,918; and 4,355,132; European patent No. 0 067 032; Japanese patents Nos. 61-236826; 61-236827; and 61-239014). These fully aromatic polyester amides have, because of their structure, outstanding properties, such as a high tensile strength and high resistance to thermal deformation. The presence of amide bonds and the aromatic components in the polymer result in an increase in the crystallinity and the melting temperature.

Temperatures in excess of 300° C. and, in some cases, in excess of 400° C. are therefore required for production and processing (spinning, injection molding, film extrusion). At these temperatures, however, decomposition reactions may already occur.

Polyester amides, which permit lower production and processing temperatures (as described e.g. in U.S. Pat. No. 4,182,842) include of polyethylene terephthalate and paraaminobenzoic acid. The molecular weight of this polyester amide after a 4-hour condensation is still too low for the processing of high-strength molded articles. For this reason, to increase the molecular weight, the polyester amide has to be subjected after the melt condensation to several hours (approximately 13 hours) of an energy-consuming solid phase condensation.

Moreover, copolyester amides are described, in U.S. Pat. No. 4,839,128, of ethylene glycol, aromatic diacids, aromatic diols, other aromatic diacids, aromatic hydroxycarboxylic acids, aromatic diamines, aminophenols and aminocarboxylic acids. The desired properties of the polyester amide are achieved according to this reference only by incorporating two other monomers, namely an aromatic diol and a further aromatic diacid, in addition to the polyester building blocks of ethylene glycol, aromatic diacid, hydroxybenzoic acid, and amide-forming monomers (diamine, aminophenol, aminocarboxylic acid). However, in melt condensation, the incorporation of such additional comonomers can lead to the formation of block structures in the polymer chain, which adversely affect the properties of the polymer.

Various methods are known for the production of polyester amides. Frequently, dicarboxylic acids, acetylated diamines, acetylated hydroxycarboxylic acids and acetylated diamines, aminophenols and aminocarboxylic acids are condensed by a transesterification/transamidation reaction in the melt to form polyester amides, with a low boiling carboxylic acid being formed as volatile condensate (Japanese patent Nos. 61-236826; 61-236827; and 61-239014; European patent No. 0 067 032; U.S. Pat. Nos. 4,182,842; 4,272,625; and 4,839,128. In addition to the requirement of a 4-hour melt condensation, this method for preparing polyester amides with aliphatic diol units, next also requires several hours of solid-phase condensation (U.S. Pat. No. 4,182,842), to obtain polycondensates of sufficiently high molecular weight.

A different method as described in GDR patent No. 271,823, discloses the reaction of polyalkylene-arylene dicarboxylate esters with aromatic diamines to produce polyester amides, while alkylene diol is liberated as the volatile condensate. The free diamines, used for this reaction can easily be oxidized. The resulting polyester amides therefore frequently have a dark color.

A further method synthesises polyester amides from dicarboxylic acid chlorides, diols, diamines and aminophenols. The reaction, however, releases corrosive hydrogen chloride gas, which must be bound by bases. In addition, the reaction must be carried out in solvents (dimethylformamide, etc.). For this reason, an expensive solvent recovery process is necessary (J. Polym. Sci., Polym. Chem. Ed. 22 (1984) 12 3983-3988; J. Polym. Sci., Polym. Chem. Ed., 19 (1981) 3285 ff.).

The linking of linear polyesters with diisocyanates for the production of polyurethanes or unsaturated polyester resins is well known (Plaste und Kautschuk, 15 (1968), 347). The reaction involves the formation of urethane bonds, which are no longer stable at the synthesis and processing temperatures employed for highly aromatic/aliphatic copolyesters. The thermal decomposition temperature for urethanes from aromatic isocyanates and R—OH is about 200° C. when R is aliphatic and about 130° C. when R is aromatic (Polyurethane, Fachbuchverlag Publisher, Leipzig, 1973, page 24).

It is furthermore well known that isocyanates tend to form the corresponding trimers at high temperatures and in the presence of basic catalysts, such as alkali acetates (Ullmans Encykl. tech. Chem., 1957, vol. 9, page 4, and Kunststoffhandbuch (Plastics Handbook) vol. 7, Polyurethanes, page 81). The trivalent isocyanurates, formed from diisocyanates, have three reactive NCO groups. When these react with linear copolyesters, they can cause branching and/or crosslinking in the polyester amide. Alkali acetates and many other metal acetates are known as conventional transesterification catalysts and are therefore practically always contained in polyesters and copolyesters, particularly in polymers, which are produced by the transacylation reactions with the splitting off of acetic acid (Polyesterfasern (Polyester Fibers), 1975, Akademieverlag Berlin, pages 116-117). Branched and crosslinked polymers have higher melting points and lower solubilities than the corresponding polymers, which are not branched or crosslinked. They may even be infusible. These polymers can therefore be processed by thermoplastic means only with difficulty, if at all.

DESCRIPTION OF THE INVENTION

It is an object of the invention to synthesize new aromatic/aliphatic copolymer amides of high molecular weight, while avoiding the occurrence of thermal decomposition reactions, dark discoloration of the polymers, and the formation of block structures. The need for a subsequent solid phase condensation reaction should be avoided as far as possible, or greatly limited from the point of view of time. Moreover, no crosslinking in the copolyester amide should take place.

The invention is based on the objective of providing a copolyester amide with improved properties through the use of more suitable starting materials for creating the polymer.

Pursuant to the invention, this objective is accomplished by a copolyester amide, which is created from divalent residues (A), (B), (C), and/or (D), and/or (E) having the respective formulae having

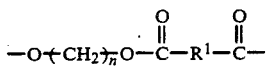  (A)

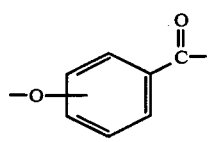  (B)

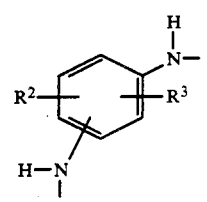  (C)

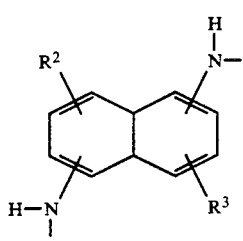  (D)

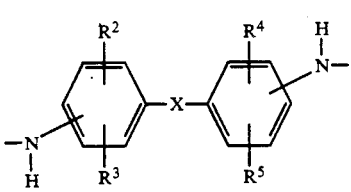  (E)

wherein $R^1$ is a divalent $C_{4-20}$ alicyclic residue or a divalent $C_{6-16}$ aromatic residue, The carbonyl groups in (A) being separated from one another by at least 3 carbon atoms, and at least 50 mole percent of the $R^1$ groups are divalent aromatic groups, n in (A) is a cardinal number of from about 2 to about 4, at least 60 mole percent of (B) represent the para isomer, the $R^2$–$R^5$ groups in (C) and (E) are independently of one another a hydrogen atom, a $C_{1-5}$ alkyl residue, a $C_{1-5}$ alkoxy residue, a nitro group, a nitrile group, or a halogen atom, the nitrogen atoms in (D) are located in the 1,3-; 1,4-; 1,6-; 1,7-; or 2,6-positions, the nitrogen atoms in (E) are located in the 4,4'-; 3,3'-; 4,3'-; or 4,5'-positions, x in (E) is a single bond, or a residue of the formula —CH$_2$—, —CH$_2$—CH$_2$—, —CH(CH$_3$)—, —CH(C$_2$H$_5$)—, —C(CH$_3$)$_2$—, —CO—, —S—, —SO$_2$—, —O—, (B) constituting of from about 30 to about 90 mole percent of (A) and (B) together, the sum of (C), (D) and (E) constituting from about 0.5 to about 10 mole percent of (B), suitably $R^1$ in (A) represents a $C_{6-16}$ divalent aromatic group, n in (A) is 2 and at least 90 mole percent of (B) is the para isomer, and (B) constitutes of from about 40 to about 85 mole percent of the aggregate of (A) and (B). In (A), $R^1$ is suitably a $C_6$ divalent aromatic group.

(A) can also have the following structure:

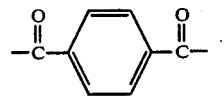

In (B) the oxygen atom is in the meta or para position relative to the carbonyl group. The nitrogen atoms in (C) are disposed meta or para to one another. Advantageously, (B) constitutes from about 50 to about 80 mole percent of the aggregate of (A) and (B). The nitrogen atoms in (E) are in the 4,4' position relative to one another, and x is —CH$_2$—.

(E) has the following structure:

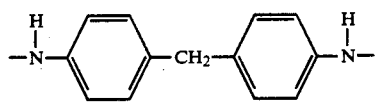

Pursuant to a most suitable embodiment of the invention, the copolyester amide is comprised of divalent groups having the formulae

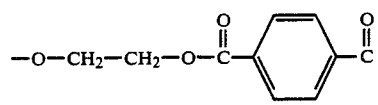

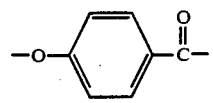

and

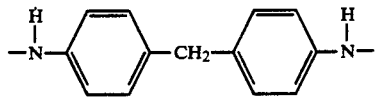

wherein (B) is of from about 60 to about 80 mole percent of the aggregate of (A) and (B), and (E) is from about 0.5 to about 5 mole percent of (B).

The invention also comprises a method for synthesizing a copolyester amide, wherein first a copolyester is synthesized by the acidolytic splitting of a linear polyester of formula (I)

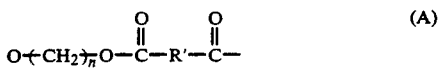  (A)

by meta- and/or para-acyloxybenzoic acid, and followed by condensation under vacuum, with stirring, and this copolyester is subsequently reacted with diisocyanates of the formulae

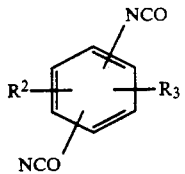

and/or

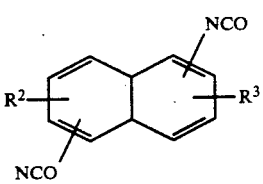

and/or

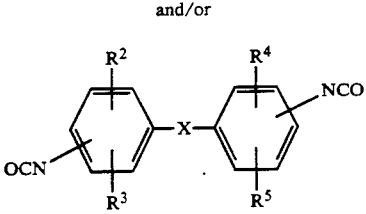

wherein
R$^1$ group in (I) is a divalent C$_{4-2}$ alicyclic residue, or a divalent C$_{6-16}$ aromatic residue, the carbonyl groups being separated from one another by at least 3 carbon atoms,
wherein at least 50 mole percent of the R$^1$ groups are divalent aromatic groups,
n is a cardinal number between about 2 and about 4,
at least 60 mole percent of the acyloxybenzoic acid is the para isomer,
R$^2$ to R$^5$ groups in (F), (G) and (H) independently of one another are a hydrogen atom, a C$_{1-5}$ alkyl residue, a C$_{1-5}$ alkyl residue, a nitro group, a nitrile group or a halogen atom,
the isocyanate groups in (F) are meta or para to one another, the isocyanate groups in (G) are in the 1,3-; 1,4-; 1,6-; 1,7-; or 2,6-position,
the isocyanate groups in (H) are in the 4,4'-; 3,3'-; 4,3'-; or 4,5'-positions,
x in the (H) is a single bond or a group of the formula —CH$_2$—, —CH$_2$—CH$_2$—, —CH(CH$_3$)—, —CH(C$_2$H$_5$)—, —C(CH$_3$)$_2$—, —CO—, —S—, —SO$_2$—, —O—,
the acyloxybenzoic acid is present in an amount corresponding to 30 to 90 mole percent of the combined molar amounts of the acyloxybenzoic acid and the (I) group,
the aggregate of (F), (G) and (H) is from about 0.5 to about 10 mole percent of the acyloxybenzoic acid.

In yet another embodiment, one can use instead of, or in admixture with diisocyanates (F), (G), and (H), compounds which release diisocyanates, such as urethanes from the aforementioned diisocyanates and aliphatic alcohols and/or phenols, which have one or more substituent, such as C$_{1-5}$ alkyl and C$_{1-5}$ alkoxy groups, halogen atoms, nitro groups and nitrile groups on the aromatic ring.

In a particularly suitable embodiment, the R$^1$ group in (I) is a divalent C$_{6-16}$ aromatic group, n is 2, 90 mole percent of the acyloxybenzoic acid comprises para isomers, and is present in an amount of from about 40 to about 85 mole percent, based on the sum of the molar amounts of the acyloxybenzoic acid and (I). Suitably R$^1$ in (I) group is a C$_6$ divalent aromatic group, or the R$^1$ group in (I) has the following structure:

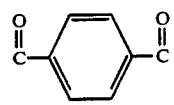

Advantageously from about 50 to about 80 mole percent acyloxybenzoic acid, based on the total amount of acyloxybenzoic acid and of (I) groups is present. The isocyanate groups can be in the 4,4'-position in (H), and x in (H) corresponds to a —CH$_2$— group. (H) can have the following structure:

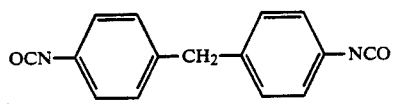

In a particularly suitable embodiment, (I) has the structure:

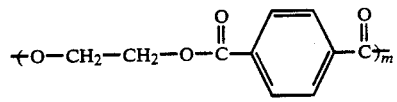

the acyloxybenzoic acid group comprises only of the para isomer, and (H) has the structure:

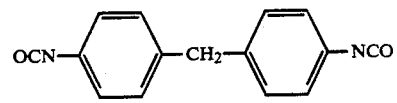

in which from about 60 to about 80 mole percent acyloxybenzoic acid is present, based on the total molar amount of acyloxybenzoic acid and (I), and from about 0.5 to about 5 mole percent, (H) is present, based on the moles of acyloxybenzoic acid. These copolyester amides are distinguished by a high molecular weight, high tensile strength and high flexural strength.

The diisocyanates and/or diisocyanate-releasing compounds can be added to the melt of the copolymer or mixed with the solid copolyester before it is melted.

It has been found to be advantageous to add the diisocyanates and/or diisocyanate-releasing compounds after 1 to 300 minutes, and suitably after 150 to 240 minutes of copolyester condensation under vacuum, at a temperature ranging from about 260° C. to 320° C. and most suitably from about 275° C. to about 300° C., and at a pressure in the range from about 106 to about 6.66×10$^{-3}$ and suitably at about 101 kPa for a period of from about 0.1 to about 50 minutes, and most suitably for a period of from about 1 to about 5 minutes, with stirring.

The diisocyanates or diisocyanate-releasing compounds can be added in solid or molten form or when dissolved in an inert solvent.

After the addition of the diisocyanates or the diisocyanate-releasing compounds, it has been found to be of advantage to continue stirring for a further from about 1 to about 60 minutes and suitably about 30 minutes at temperatures of from about 260° C. to about 320° C. and suitably from about 275° C. to about 300° C. at pressures of from about 106 to about $6.66 \times 10^{-3}$ kPa, and suitably under a reduced pressure from about 133 to about 6.66 Pa.

The addition of diisocyanates and/or diisocyanate-releasing compounds to the copolyester melt can also be carried out in an extruder, preferably equipped with degassing equipment in the aforementioned temperature range by using metering equipment with residence times of the polymer in the extruder of from about 1 to about 30 minutes, and suitably of from about 5 to about 10 minutes. After the addition of these compounds, the polymer can be degassed under a reduced pressure of 13,300 to 133 Pa in the extruder.

The diisocyanates and/or diisocyanate-releasing compounds can be added to the molten copolymer, and/or copolyester before it is melted.

It was surprisingly found that the copolyester amides have very high inherent viscosities $$\eta_{inh.} = \frac{\ln \eta_{rel}}{c}$$

of 0.9 to 1.2 and higher.

Therefore, no subsequent solid-phase condensation, requiring much energy and expensive equipment, is required. The copolyester amides are pale polymers, without indications of thermal decomposition. The copolyester amides from ethylene glycol, terephthalic acid, p-hydroxybenzoic acid and various diisocyanates, like the corresponding copolyesters, are surprisingly completely soluble to a hydroxybenzoate content of 75 mole percent, based on the total number of moles of ethylene terephthalate and hydroxybenzoic acid, in the solvent mixture of 40 parts by volume of tetrachloroethane (1,1,2,2) and 60 parts by volume of phenol. Thus, crosslinking due to the addition of diisocyanate can therefore be avoided. The solution viscosities were measured in the same solvent mixture at a polymer concentration (C) of 0.5 g/100 ml.

The compounds, already present in the starting polyester (I), were used as transesterification catalysts for this method. The addition of additional catalysts is possible in principle.

The invention is further described in greater detail in the following with reference to the examples.

EXAMPLE 1

This example describes the synthesis of a copolyester amide from 59.7 mole percent of hydroxybenzoate, 39.8 mole percent of poly(ethylene terephthalate) and 0.42 mole percent of methylene-p,p'-diphenyl diisocyanate.

75.6 g (0.419 moles) of p-acetoxybenzoic acid and 53.8 g (0.279 moles) of polyethylene terephthalate granulate ($\eta_{inh}$=0.81 dl/g), in which $3 \times 10^{-4}$ moles of Ti(On-C$_4$H$_9$)$_4$ per mole of terephthalate were contained, were mixed and molten at 275° C. 500 ml 4-neck flask, equipped with a vacuum-tight stirrer, nitrogen inlet and distillation head with receiver and vacuum connection, under a stream of nitrogen on a metal bath. After 60 minutes at 275° C. with stirring and under a stream of nitrogen (101 kPa), the bulk of the acetic acid formed is distilled off. A melt of low viscosity is present. After that, a vacuum (66.5 Pa) is applied and further acetic acid is removed from the melt by stirring for 2 hours at 275° C.

After the vacuum is changed to a stream of nitrogen, 0.75 g (0.003 moles), corresponding to 0.7 mole percent, based on the p-acetoxybenzoic acid used, of methylene-p,p'-diphenyl diisocyanate (MDI) of the formula

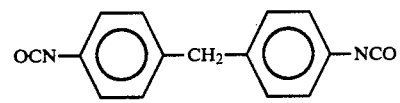

are added to the melt through the open neck of the flask, with stirring. The stream of nitrogen is changed to vacuum (66.5 Pa), and the stirring of the melt is continued for 30 minutes at 275° C. under vacuum. The resulting copolyester amide has an intrinsic viscosity $\eta_{inh}$ of 1.1 dl/g.

The resulting product is injection molded at a melt temperature of 250° C. and a die temperature 25° C., to 1.8 mm thick small rods with a shoulder. Mechanical testing according to East German materials testing standards Nos. TGL 14070 and TGL 39782 showed a tensile strength of 220 MPa, and a tensile modulus of 9.2 GPa.

EXAMPLE 2

This example describes the preparation of a copolyester amide from 39.7 mole percent of poly(ethylene terephthalate), 59.6 mole percent of hydroxybenzoate and 0.7 mole percent of 2,4-toluyl diisocyanate.

In a 500 ml 4-neck flask, with a vacuum-tight stirrer, nitrogen inlet and distillation head with receiver and vacuum connection, 75.6 g (0.419 moles) of p-acetoxybenzoic acid and 53.8 g (0.279 moles) of polyethylene terephthalate granulate ($\eta_{inh}$=0.81 dl/g), in which $3 \times 10^{-4}$ moles of Ti(On-C$_4$H$_9$)$_4$ per mole of terephthalate were contained, were mixed and molten at 275° C. under a stream of nitrogen in a metal bath. After 60 minutes at 275° C. with stirring and under a stream of nitrogen at 101 kPa, the bulk of the acetic acid that formed is distilled off. A low viscosity melt is present. After that, a vacuum (66.5 Pa) is applied and further acetic acid is removed from the melt by stirring for 2 hours at 275° C.

After the vacuum is changed for a stream of nitrogen, 0.9 g (0.0051 moles), corresponding to 1.19 mole percent based on the p-acetoxybenzoic acid used, of 2,4-toluyl diisocyanate (TDI)

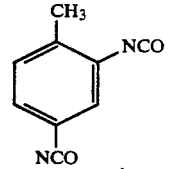

are added to the melt through the open neck of the flask, with stirring. The stream of nitrogen is changed for a vacuum (66.5 Pa) and the stirring of the melt is continued for 45 minutes at 275° C. under vacuum. The resulting copolyester amide has an intrinsic viscosity of $\eta_{inh}$ 1.05 dl/g.

EXAMPLE 3

This example describes the preparation of a copolyester amide from 59.6 mole percent of hydroxybenzoate, 39.7 mole percent of poly(ethylene terephthalate), and 0.7 mole percent of methylene-p,p'-diphenyl urethane.

In a 500 ml 4-neck flask, with a vacuum-tight stirrer, nitrogen inlet and distillation head with receiver and vacuum connection, 75.6 g (0.419 moles) of p-acetoxybenzoic acid and 53.8 g (0.279 moles) of polyethylene terephthalate granulate ($\eta_{inh}=0.81$ dl/g), in which $3\times10^{-4}$ moles of Ti(O—n—C$_4$H$_9$) per mole of terephthalate were contained, were mixed and fused at 275° C. under a stream of nitrogen on a metal bath. After 60 minutes at 275° C. with stirring under a stream of nitrogen at 101 kPa, the bulk of the acetic acid that formed is distilled off. A low viscosity melt is present. After that, a vacuum (66.5 Pa) is applied and further acetic acid is removed from the melt by stirring for 2 hours at 275° C.

After the vacuum is changed to a stream of nitrogen, 2.2 g (0.0051 moles), corresponding to 1.19 mole percent based on the p-acetoxybenzoic acid of methylene-p,p'-diphenylene diphenylurethane

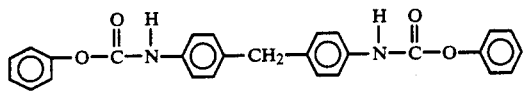

is added to the melt through the open neck of the flask with stirring. A highly viscous melt results. The stream of nitrogen is changed to a vacuum (66.5 Pa), and the stirring of the melt is continued for 60 minutes at 275° C. under vacuum. The resulting copolyester amide has an intrinsic viscosity $\eta_{inh}$ 1.1 dl/g.

EXAMPLE 4

In a 10 l stainless steel stirred vessel with nitrogen inlet and a distillation head with vacuum connection, 3,000 g (16.66 moles) of p-acetoxybenzoic acid, corresponding to 60 mole percent, and 2,134 g of poly(ethylene terephthalate) (11.1 moles) with an intrinsic viscosity of 0.81 dl/g and an inherent catalyst of $3\times10^{-4}$ moles of Ti(On-C$_4$H$_9$)$_4$ per mole of terephthalate, corresponding to 40 mole percent, are heated in a stream of dry nitrogen to 275° C. The bulk of the acetic acid released is distilled off over a period of 75 minutes. After that, the pressure is slowly reduced to a vacuum of 66.5 Pa. The melt is stirred for 3 hours at 275° C. and 66.5 Pa, a copolyester with an intrinsic viscosity of 0.60 dl/g being obtained. After the vacuum is exchanged for a nitrogen pressure of 0.15 MPa, the copolyester is emptied in the molten state from the vessel through an opening in the bottom and supplied over a gear pump and a thermally insulated pipeline to a 2-shaft extruded with a metering facility and degassing equipment. The shaft diameter is 28 mm. The temperature of the extruder is set at 275° C., the residence time at 2.5 minutes and the rotary speed at 70 rpm. Methylene-p,p'-diphenyl diisocyanate (MDI)

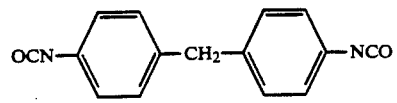

in molten form is metered by metering in an amount of 0.7 mole percent, based on the p-acetoxybenzoic acid used apparatus into copolyester melt. The viscosity of the melt increases at the same time. The copolyester amide is taken off as an extrudate at the extruder outlet, cooled in a water bath and processed into a granulate. The copolyester amide obtained has an intrinsic viscosity $\eta_{inh}$ 1.12 dl/g.

EXAMPLE 5

This example describes the preparation of a copolyester amide from 39.7 mole percent of poly(ethylene terephthalate), 59.6 mole percent of hydroxybenzoate and 0.7 mole percent of 2,6-naphthalene diisocyanate.

In a 500 ml 4-neck flask, equipped with a vacuum-tight stirrer, nitrogen inlet and distillation head with receiver and vacuum connection, 75.6 g (0.419 moles) of p-acetoxybenzoic acid and 53.8 g (0.279 moles) of polyethylene terephthalate granulate ($\eta_{inh}=0.81$ dl/g), in which $3\times10^{-4}$ moles of Ti(On-C$_4$H$_9$)$_4$ per mole of terephthalate were contained, were mixed and molten at 275° C. under a stream of nitrogen in a metal bath. After 60 minutes at 275° C. with stirring and under a stream of nitrogen (101 kPa), the bulk of the acetic acid formed is distilled off. A melt of low viscosity is present. After that, a vacuum (66.5 Pa) is applied and further acetic acid is removed from the melt by stirring for 2 hours at 275° C.

The vacuum is followed by a stream of nitrogen, 1.07 g (0.0051 moles), corresponding to 1.19 mole percent based on the p-acetoxybenzoic acid used, of 2,6-naphthalene diisocyanate

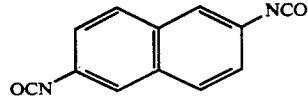

are added to the melt through the open neck of the flask with stirring. A highly viscous melt results. The stream of nitrogen is followed by a vacuum (66.5 Pa) and the stirring of the melt is continued for 45 minutes at 275° C. under a vacuum. The resulting copolyester amide has an intrinsic viscosity $\eta_{inh}$ 1.07 dl/g.

The copolyester amide is characterized by containing no significant amounts of oxygen bonds between the aliphatic and aromatic groups. The expression "no significant amounts" or used herein, below any concentration, if any oxygen bonds are present at all, that can be detected by nuclear magnetic resonance apparatus. This means that the amount of these oxygen bonds is less than about 3 mole percent.

We claim:

1. A copolyester amide containing divalent residues (A), (B), (C) and/or (D) and/or (E) having the following structures

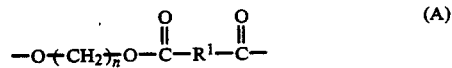  (A)

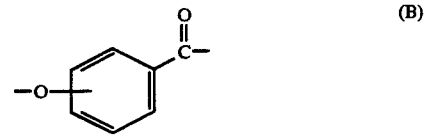  (B)

-continued

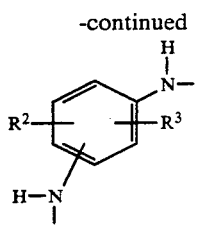
(C)

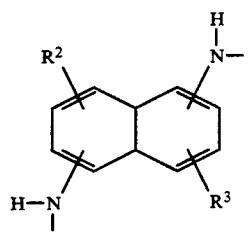
(D)

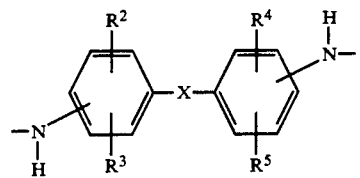
(E)

wherein
R$^1$ is a C$_{4-20}$ divalent alicyclic residue or a divalent C$_{6-16}$ aromatic residue,
the carbonyl groups in (A) being separated from one another by at least 3 carbon atoms,
at least 50 mole percent of the R$^1$ groups being divalent aromatic groups,
n in (A) is a cardinal number from about 2 to about 4,
(B) comprises at least 60 mole percent of the para isomer,
the R$^2$ to R$^5$ groups in (C), (D) and (E) being the same or different are hydrogen, a C$_{1-5}$ alkyl residue, a C$_{1-5}$ alkoxy residue, nitro, nitrile, or halogen,
the nitrogen atoms in (D) are disposed in the 1,3; 1,4; 1,6; 1,7; or 2,6-positions,
the nitrogen atoms in (E) are disposed in the 4,4'; 3,3'; 4,3'; or 4,5'-positions,
x in (E) is a single bond or a group of the formula —CH$_2$—, —CH$_2$—CH$_2$—, —CH(CH$_3$)—, —CH(C$_2$H$_5$)—, —C(CH$_3$)$_2$—, —CO—, —S—, —SO$_2$—, or —O—,
(B) being from about 30 to about 90 mole percent of the aggregate of (A) and (B),
and the sum of (C), (D) and (E) being of from about 0.5 to about 10 mole percent of (B).

2. The copolyester amide of claim 1, in which
R$^1$ in (A) is a divalent, C$_{6-16}$ aromatic residue,
n in (A) is 2,
at least 90 mole percent of (B) is the para isomer, and
(B) is present in an amount of 40 to 85 mole percent, based on the total number of moles of (A) and (B).

3. The copolyester amide of claim 1 wherein R$^1$ in (A) is divalent C$_6$ aromatic residue.

4. The copolyester amide of claim 1 wherein (A) has the structure $$-\overset{O}{\underset{\|}{C}}-\underset{\phantom{X}}{\bigcirc}-\overset{O}{\underset{\|}{C}}-$$

5. The copolyester amide of claim 2, wherein (A) has the structure:

$$-\overset{O}{\underset{\|}{C}}-\underset{\phantom{X}}{\bigcirc}-\overset{O}{\underset{\|}{C}}-$$

6. The copolyester amide of claim 1, wherein the oxygen in (B) is present in the meta or para position relative to the carbonyl group.

7. The copolyester amide of claim 1, wherein the nitrogen atoms in (C) are in the meta or para positions to one another.

8. The copolyester amide of claim 1, wherein (B) is present in an amount of 50 to 80 mole percent, based on the total number of moles of (A) and (B).

9. The copolyester amide of claim 8, wherein (B) is present in an amount of 50 to 80 mole percent, based on the total number of moles of (A) and (B).

10. The copolyester amide of claim 1, wherein the nitrogen atoms in (E) are in the 4,4'-position and x is —CH$_2$—.

11. The copolyester amide of claim 10, wherein (E) has the structure $$-\overset{H}{\underset{|}{N}}-\underset{\phantom{X}}{\bigcirc}-CH_2-\underset{\phantom{X}}{\bigcirc}-\overset{H}{\underset{|}{N}}-$$

12. The copolyester amide of claim 1, comprised of recurring divalent groups of the formulae wherein (B) is present in an amount of 60 to 80 mole percent relative to the total number of moles of (A) and (B), and that (E) is present in an amount of 0.5 to 5 mole percent, based on the number of moles of (B).

13. A process for preparing copolyester amides having recurring aromatic, aliphatic and/or alicyclic units, comprising mixing a polyester of (A) as defined in claim 1, with para- and/or meta-acyloxybenzoic acid, then fusing, splitting off the acid and condensing the mixture under reduced pressure to form the copolyester, by reacting a copolyester at a temperatures of from about 260° C. to about 320° C. while stirring, with one or more of the following diisocyanates (F)

and/or

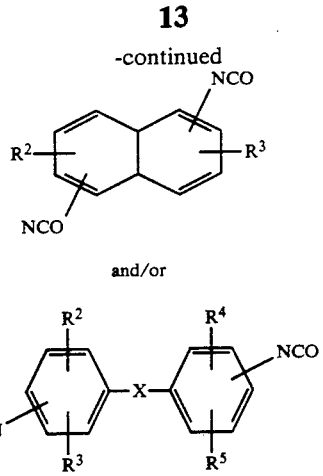

wherein
R² to R⁵ in (F), (G) and (H) is independently of one another hydrogen, a $C_{1-5}$ alkyl residue, a $C_{1-5}$ alkoxy residue, nitro, nitrile, or halogen,
the isocyanate groups in (F) are meta or para to one another,
the isocyanate groups in (G) are in the 1,3; 1,4; 1,6; 1,7; or 2,6-position, the isocyanate groups in (H) are in the 4,4'; 3,3'; 4,3'; or 4,5'-positions, and
x in (H) is a single bond or a group of the formula —CH₂—, —CH₂—CH₂—, —CH(CH₃)—, —CH(C₂H₅)—, —C(CH₃)₂—, —CO—, —S—, —SO₂—, —O—.

14. The method of claim 13, wherein the diisocyanates are added to the melt of the copolyester.

15. The process of claim 13, wherein the diisocyanates are mixed with the solid copolyester, before the heating of the copolyester.

16. The process of claim 13, wherein the diisocyanates are added to the copolyester in amounts of 0.5 to 10 mole percent based on the acetoxybenzoic acid used.

17. The process of claim 14, wherein the diisocyanates are added to the copolyester in amounts of 0.5 to 10 mole percent based on the acetoxybenzoic acid used.

18. The process of claim 15, wherein the diisocyanates are added to the copolyester in amounts of 0.5 to 10 mole percent based on the acetoxybenzoic acid used.

19. The process of claim 13, wherein the diisocyanates are added to the copolyester after the acidolytic splitting of recurring polyester groups (A), and/or after 1 to 300 minutes of condensation under vacuum and with stirring.

20. The process of claim 14, wherein the diisocyanates are added to the copolyester after the acidolytic splitting of recurring polyester groups (A), and/or after 1 to 300 minutes of condensation under vacuum and with stirring.

21. The process of claim 15, wherein the diisocyanates are added to the copolyester after the acidolytic splitting of recurring polyester groups (A), and/or after 1 to 300 minutes of condensation under vacuum and with stirring.

22. The process of claim 16, wherein the diisocyanates are added to the copolyester after the acidolytic splitting of recurring polyester groups (A), and/or after 1 to 300 minutes of condensation under vacuum and with stirring.

23. The process of claim 13, wherein the diisocyanates are added to the copolyester melt at a temperatures of from about 270° C. to about 300° C. and at a pressure from 106 to $6.66 \times 10^{-3}$ kPa, under a nitrogen or noble gas during a period of 0.1 to 50 minutes.

24. The process of claim 13, wherein the diisocyanates are added to the copolyester in solid or molten, or are dissolved in an inert solvent.

25. The process of claim 13, wherein after the addition of the diisocyanates, stirring is continued for an additional from about 1 to about 60 minutes at a temperature of from about 260° C. to about 320° C. a pressure from about 106 to about $6.66 \times 10^{-3}$ kPa,.

26. The process of claim 13, wherein the reaction between copolyesters and diisocyanates is carried out in an extruder, during a residence time of from about 1 to about 30 minutes, with subsequent degassing under a vacuum of about 13,300 to about 133 Pa.

27. The process of claim 13, wherein the diisocyanates are added to the copolyester melt during the extrusion through a metering device.

28. The process of claim 13, wherein the isocyanate groups in (F) are in the meta or para positions to one another.

* * * * *